United States Patent [19]

Grow

[11] 4,073,501
[45] Feb. 14, 1978

[54] VEHICLE ENTRY WAY ELEVATOR STEP

[76] Inventor: Donald G. Grow, R.R. 1, Perry, Iowa 50220

[21] Appl. No.: 690,980

[22] Filed: May 28, 1976

[51] Int. Cl.$^2$ .............................................. B60R 3/02
[52] U.S. Cl. ............................... 280/164 R; 105/445; 182/88; 280/166
[58] Field of Search ............ 296/146; 280/163, 164 R, 280/164 A, 166; 182/88; 105/443, 444, 445, 446, 447, 448, 449

[56] References Cited

U.S. PATENT DOCUMENTS

| | | | |
|---|---|---|---|
| 1,109,224 | 9/1914 | Herrin | 105/445 |
| 3,572,754 | 3/1971 | Fowler | 105/447 |
| 3,672,311 | 6/1972 | Duba | 280/166 |
| 3,913,497 | 10/1975 | Maroshick | 280/166 |
| 3,957,284 | 5/1976 | Wright | 280/166 |

*Primary Examiner*—Joseph F. Peters, Jr.
*Assistant Examiner*—John A. Carroll
*Attorney, Agent, or Firm*—Zarley, McKee, Thomte, Voorhees & Sease

[57] ABSTRACT

A bus vehicle includes an entry way having a lower step, a middle step and a third step which is the floor of the vehicle. The bottom step is vertically movable to three positions, a ground engaging position, a position in the plane of the bottom of the vehicle and a position in the plane of the vehicle floor. A step extension portion is pivotally connected to the movable step and pivots out of the way when the step is in its two lowered positions and pivots to a horizontal position when the step is in its raised floor position thereby providing a continuous floor over the entry way. A closure plate closes the bottom of the entry way and is movable downwardly by the movable step when moving to its ground engaging position.

11 Claims, 7 Drawing Figures

VEHICLE ENTRY WAY ELEVATOR STEP

BACKGROUND OF THE INVENTION

Vehicles used for transporting large numbers of people, including city buses and school buses, are generally higher above the ground than passenger car vehicles. Accordingly, several steps are provided in the entry way for passengers to climb between the ground and the floor of the vehicle.

Handicapped persons, such as a person on crutches, cannot easily climb steps and thus entering or leaving a bus is a very difficult problem.

SUMMARY OF THE INVENTION

The vehicle entry way elevator step of this invention involves the bottom step in the entry way being made vertically movable so that it can be moved from a position on the ground to the bottom step position of the entry way and finally to the raised position where it is in the plane of the floor of the bus such that a passenger can be moved between the ground and the floor of the bus without having to do any climbing. Additionally, other passengers may use the entry way in a normal manner when the elevator step is in its transport position at the bottom of the vehicle. A step extension portion is pivotally connected to the elevator step and automatically moves from a vertical position when the elevator step is lowered to a horizontal position when the elevator step is raised whereby a continuous floor area is established over the top of the entry way.

Hydraulic cylinders on the opposite sides of the elevator step are connected to the oppositely disposed sidewalls of the entry way and cylinder enclosures are carried on the elevator step for appearance and safety reasons. A handle is provided at the top of one of the enclosures.

A closure plate is provided to close the bottom of the entry way when the elevator step is in its normal position or in its raised position. The closure plate is normally spring biased upwardly into engagement with the bottom of the vehicle but is movable downwardly in response to the elevator step moving downwardly.

DESCRIPTION OF THE PREFERRED EMBODIMENT

Figure 1:
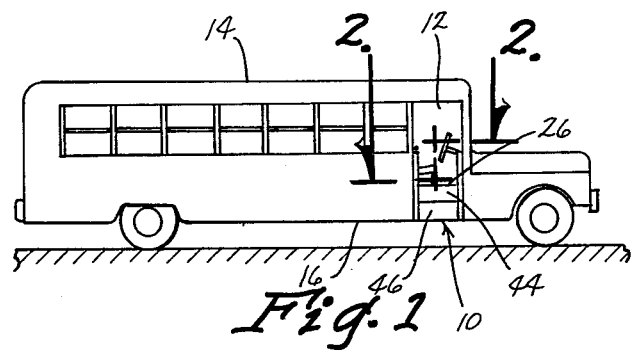
FIG. 1 is a side elevation view of a school bus employing the vehicle entry way elevator step of this invention.

The elevator step of this invention is referred to generally in FIG. 1 by the reference 10 and is shown in the entry way 12 of a school bus 14.

The step 10 is seen in FIGS. 1, 2, 3 and 6 in its normal lowered position in the plane of the bottom 16 of the bus 14. In this position it functions as the bottom step of the entry way 12 and may be used in a conventional manner by passengers entering and leaving the bus. This is also the transport position.

The entry way 12 is defined by oppositely disposed sidewalls 20 and 22 and a backwall 24. The interior of the bus includes a floor 26. A pair of outwardly pivotal doors 28 are pivotally connected to the outer edges of the oppositely disposed sidewalls 20 and 22.

The step 10 is raised and lowered by a pair of hydraulic cylinders 30 and 32 secured to the oppositely disposed sidewalls 20 and 22. The piston rods 34 and 36 are connected to the opposite ends 38 and 40 of the step 10.

The rear wall 24 includes a stationary step 42 having an upper riser portion 44 and a lower riser portion 46. The upper riser portion 44 extends to the floor 26 while the lower riser portion 46 extends to the bottom 16 of the bus.

Figure 5:
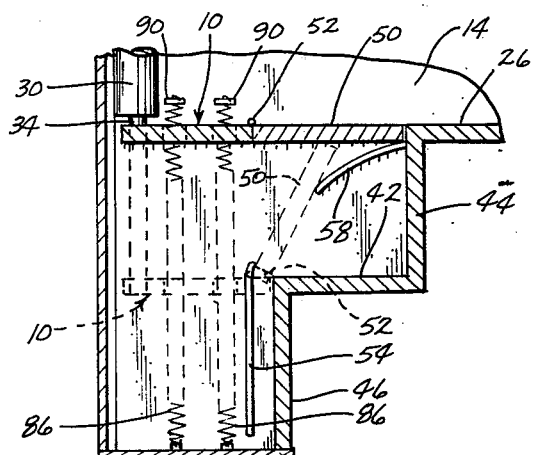
FIG. 5 is a cross sectional view taken along line 6—6 in FIG. 3, but showing the elevator step in its raised floor position.
Figure 6:
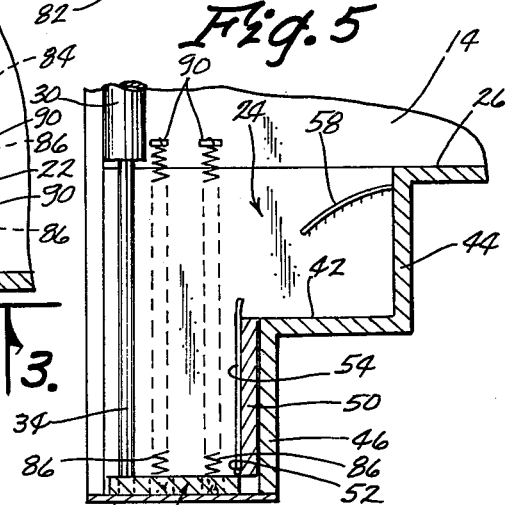
FIG. 6 is a cross sectional view taken along line 6—6 in FIG. 3 showing the elevator step in its lower normal transport position.
Figure 7:
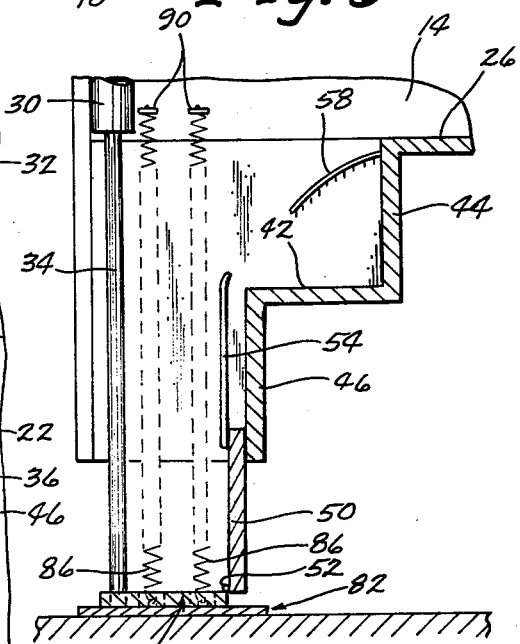
FIG. 7 is a cross sectional view taken along lines 6—6 in FIG. 3 showing the elevator step in its lowered position on the ground.

The elevator step 10 includes an extension portion 50 pivotally connected thereto along its back edge by a piano hinge 52 for pivotal movement between a vertical position in parallel engaging relationship with the riser portion 46 when the elevator step is in the normal down position of FIG. 6 or the ground engaging position of FIG. 7, and a horizontal position as seen in FIG. 5 when the elevator step is in its raised floor position. A vertical guide element 54 is provided on the sidewall 20 for engagement with the outer face of the extension portion 50 to maintain it in parallel engaging contact with the lower riser portion 46 when the elevator step is in its lower two positions. The second guide element 58 is positioned diagonally between the floor 26 and the vertical guide element 54 to guide and support the extension portion 50 as it moves to its raised floor position of FIG. 5. It is seen that the guide element 58 engages the extension portion 50 along its bottom side opposite the front face engaged by the vertical guide element 54. Thus it is seen when the elevator step 10 and its extension portion 50 are in its raised floor position of FIG. 5 the entire upper end of the entry way is closed by the step 10 and the extension portion 50 forming a continuous floor with the bus floor 26.

Figure 2:
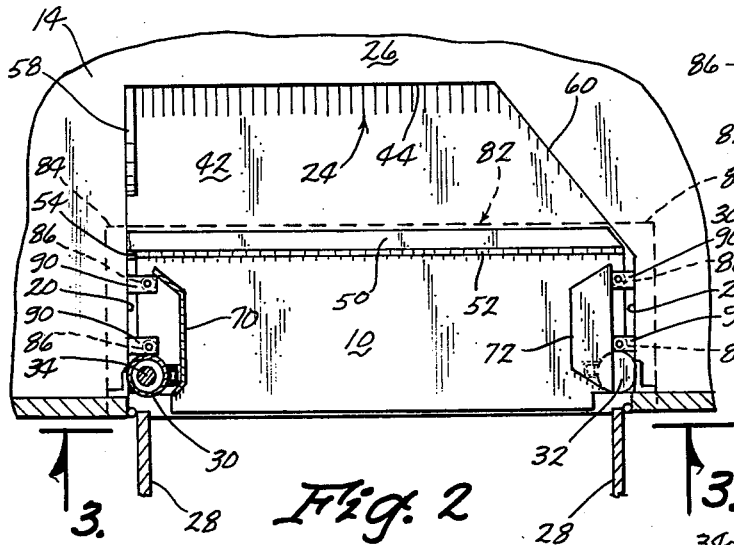
FIG. 2 is a cross sectional view taken along line 2—2 in FIG. 1, showing the elevator step in its normal down transport position such as a conventional bottom step in the entry way.

The entry way sidewall 22 as seen in FIG. 2 includes a diagonally extending wall portion 60 which merges with the upper riser portion 44 of backwall 24. The elevator step extension 50 has a shape that corresponds to the area over the stationary step 42 defined by the diagonal wall 60 and the opposite portion of sidewall 20 and the upper riser portion 44, and thus the elevator step 10 and the extension portion 50 present a solid continuous extension of the floor 26 when the step is in its raised position of FIG. 5.

Figure 4:
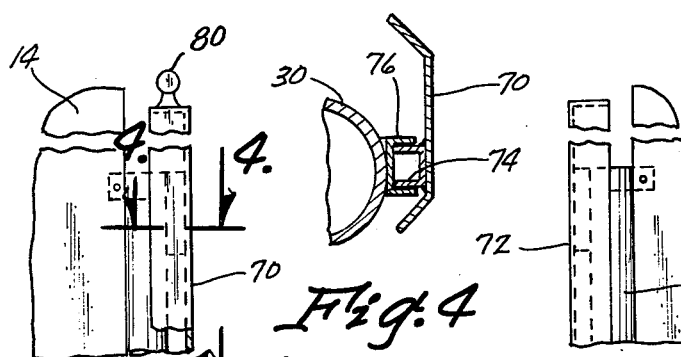
FIG. 4 is a cross sectional view taken along line 4—4 in FIG. 3.

Each of the power cylinders 30 are enclosed by cylinder enclosures 70 and 72 movable with the step 10 and engaging the cylinders 30 and 32 through a rib 74 engaging a groove or track 76 on the outer vertical surface of the cylinders as seen in FIG. 4. Accordingly, horizontal movement is prevented while allowing vertical movement for the cylinder enclosures 70 and 72. A handle 80 is provided on top of the cylinder enclosure 70.

Figure 3:
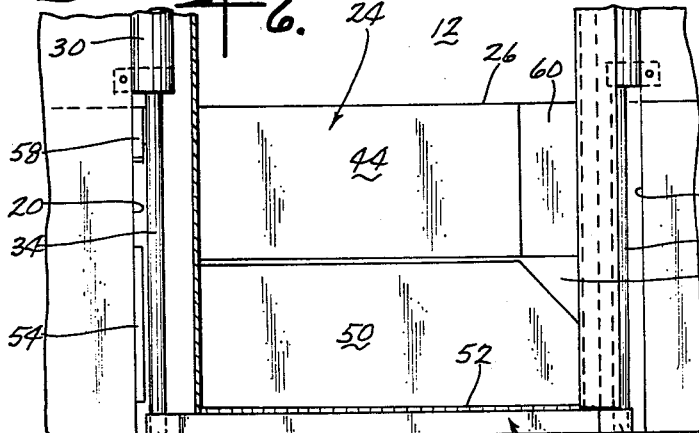
FIG. 3 is a cross sectional view taken along lines 3—3 in FIG. 2.

To close the bottom of the entry way a closure plate 82 larger than the bottom of the entry way is provided for engagement with the bottom of the vehicle as seen in FIG. 3 wherein an outer peripheral flange 84 extends beyond the bottom opening of the entry way and engages the bottom of the vehicle. A pair of springs 86 normally bias the closure plate 82 upwardly into engagement with the bottom of the vehicle and the upper ends are secured to a pair of ears 90 on the entry way sidewall 20 behind the cylinder enclosure 70 as seen in FIG. 2.

Thus in operation is seen that the vehicle entry way is provided with three steps when used conventionally, the lower elevator step 10, the middle stationary step 42 and the bus floor 26. When the entry way is to be used as an elevator the elevator step 10 is lowered to the ground as seen in FIG. 7 by the power cylinders 30 and 32 allowing a passenger to step onto the elevator step 10, whereupon the power cylinders are raised moving the elevator step 10 to the floor position of FIG. 5, whereby the passenger may easily move about in the interior of the bus. The elevator step extension portion 50 moves automatically from its vertical position parallel to the lower riser portion 46 out of the way when the elevator step is in its two lowered positions of FIGS. 6 and 7 to a horizontal floor position when the elevator step is in its raised position of FIG. 5. The bottom of the entry way is closed to outside contamination by the closure plate 82 normally spring biased upwardly to its closed position by the springs 86. The elevator step 10 moves the closure plate 82 out of its normally closed position when the elevator step 10 is moved to its lowered ground engaging position of FIG. 7. The power cylinders 30 are obscured by the cylinder enclosures 70 and 72 which move with the elevator step 10. A hand hold 80 is provided on the cylinder closure 70 for the passengers' convenience in riding the elevator step 10.

What is claimed is:

1. In combination a vehicle, having an access entry way and an elevator step comprising,
    a floor in said vehicle above the outside ground level,
    said entryway being defined by a pair of opposite sidewalls, a back wall and a door opposite said back wall,
    said elevator step being positioned in said entryway and being movable between a raised position in the plane of said floor and a lowered position adjacent the ground to a position between said floor and the ground substantially in the plane of the bottom of the vehicle,
    power means connected to said elevator step for raising and lowering said elevator step, and
    a closure plate being positioned below and in operative engagement with said elevator step and being yieldably held in a raised position in the plane of the bottom of the vehicle for closing the bottom end of said access entryway, and said closure plate being larger in area than said elevator step and said bottom end of said access entryway whereby when said elevator step is lowered below the bottom of said vehicle said closure plate is moved downwardly by said step and when said step is raised above the bottom of said vehicle, said closure plate engages and is retained by the bottom of said vehicle.

2. The structure of claim 1 wherein said power means comprises vertically disposed hydraulic cylinders on said oppositely disposed sidewalls of said entry way.

3. The structure of claim 2 wherein said back wall of said entry way includes a stationary step having vertically disposed riser portions above and below extending to said floor and the bottom of said vehicle whereby when said elevator step is in said position at the bottom of the vehicle a series of three steps are provided from the ground to the floor of said vehicle.

4. The structure of claim 3 wherein said elevator step includes an extension portion pivotable between a vertical position when said elevator step is below said floor and a horizontal position in the plane of said floor when said elevator step is in said raised floor position whereby said floor is substantially continuous over the top of said entry way.

5. The structure of claim 4 wherein said extension portion is substantially parallel to said lower riser portion when said elevator step is in said position at the bottom of the vehicle and said position adjacent the ground.

6. The structure of claim 5 wherein guide elements are provided on one of said oppositely disposed sidewalls of said entry way to guide said extension portion between said horizontal raised position and said vertical lowered position.

7. The structure of claim 6 wherein said guide elements include an element parallel to said lower vertical riser portion and positioned to engage an outer face of said extension portion opposite said lower vertical riser and a second guide portion extending diagonally between said upper and lower riser portions for supporting and guiding said extension portion to said raised position in the plane of said floor.

8. The structure of claim 1 wherein said power means comprises vertically disposed hydraulic cylinders on said oppositely disposed sidewalls of said entry way, a pair of vertically positioned cylinder enclosures provided on said elevator step substantially enclosing said cylinders and a rib and groove connection being provided between said enclosures and said cylinders whereby said enclosures are limited against horizontal movement and are thereby movable vertically with said elevator step.

9. In combination a vehicle, having an access entryway and an elevator step comprising,
    a floor in said vehicle above the outside ground level,
    said entryway being defined by a pair of opposite sidewalls, a back wall and a door opposite said back wall,
    said elevator step being positioned in said entryway and being movable between a raised position in the plane of said floor and a lowered position below said floor,
    power means connected to said elevator step for raising and lowering said elevator step,
    said back wall of said entryway including a stationary step having vertically disposed riser portions above and below extending to said floor and the bottom of said vehicle, respectively, whereby when said elevator step is in said position at the bottom of the vehicle a series of three steps are provided from the ground to the floor of said vehicle,
    said elevator step including an extension portion pivotable between a vertical position when said elevator step is below said floor and a horizontal position in the plane of said floor when said elevator step is in said raised floor position whereby said floor is substantially continuous over the top of said entry way, said extension portion being substantially parallel to said lower riser portion when said elevator step is in said position at the bottom of the vehicle and said position adjacent the ground, and guide means on one of said oppositely disposed sidewalls of said entryway to guide said extension portion between said horizontal raised position and said vertical lowered position.

10. The structure of claim 9 wherein said guide means includes an element parallel to said lower vertical riser portion and positioned to engage an outer face of said extension portion opposite said lower vertical riser and a second guide portion extending diagonally between said upper and lower riser portions for supporting and guiding said extension portion to said raised position in the plane of said floor.

11. The structure of claim 9 wherein said power means comprises vertically disposed hydraulic cylinders on said oppositely disposed sidewalls of said entryway, a pair of vertically positioned cylinder enclosures provided on said elevator step substantially enclosing said cylinders and a rib and groove connection being provided between said enclosures and said cylinders whereby said enclosures are limited against horizontal movement and are thereby movable vertically with said elevator step.

* * * * *